United States Patent [19]

Minchak et al.

[11] 4,380,617

[45] Apr. 19, 1983

[54] PREPARATION OF POLYMERS FROM CYCLOOLEFINS

[75] Inventors: Robert J. Minchak, Parma Heights; Timothy J. Kettering, Cleveland; William J. Kroenke, Brecksville, all of Ohio

[73] Assignee: The B. F. Goodrich Company, Akron, Ohio

[21] Appl. No.: 340,921

[22] Filed: Jan. 20, 1982

[51] Int. Cl.³ .............................................. C08F 4/78
[52] U.S. Cl. .............................. 526/161; 252/431 N; 526/283
[58] Field of Search ................................ 526/161, 283

[56] References Cited

U.S. PATENT DOCUMENTS

| | | | |
|---|---|---|---|
| 3,627,739 | 12/1971 | Devlin et al. | 526/283 |
| 3,778,420 | 12/1973 | Brown et al. | 526/283 |
| 4,020,254 | 4/1977 | Ofstead | 526/283 |
| 4,069,376 | 1/1978 | Minchak | 526/283 |
| 4,138,448 | 2/1979 | Minchak | 526/283 |

*Primary Examiner*—Stanford M. Levin
*Attorney, Agent, or Firm*—George A. Kap

[57] ABSTRACT

Process for polymerizing by ring opening polymerization of a norbornene-type monomer, or a mixture thereof, with or without at least one other polymerizable monomer, in presence of an alkylaluminum halide cocatalyst and an organoammonium molybdate or tungstate catalyst that is soluble in a hydrocarbon reaction solvent and the norbornene-type monomer.

10 Claims, No Drawings

PREPARATION OF POLYMERS FROM CYCLOOLEFINS

BACKGROUND OF THE INVENTION

Preparation of norbornene-type monomers is well known. Dicyclopentadiene can be made by dimerizing cyclopentadiene by the Diels-Alder reaction whereas dihydrodicyclopentadiene can be made by the Diels-Alder reaction of cyclopentadiene and cyclopentene. Norbornenes can also be prepared by the Diels-Alder reaction of cyclopentadiene with selected olefins to yield either norbornene or substituted norbornenes. Tetracyclododecene compounds are by-products formed from the Diels-Alder reaction of cyclopentadiene and norbornenes. Symmetrical and unsymmetrical trimers and tetramers of cyclopentadiene can, likewise, be prepared by the Diels-Alder reaction of cyclopentadiene.

Polymeric materials prepared from monomers containing norbornene moiety, i.e. cyclicolefins, can be made as elastomers, which are flexible at room temperature, or as plastics, which can be rigid at room temperature. They can be calendered and thermoformed to make rigid automotive products such as glovebox covers, hubcaps, and other automotive and nonautomotive products.

More specifically, polymers of cyclic olefins can be prepared by ring opening polymerization of the olefins in the presence of a metathesis catalyst comprising at least one alkylaluminum halide cocatalyst and at least one tungsten or molybdenum compound catalyst, preferably tungsten or molybdenum halide. This is accomplished by mixing the cyclic olefins with a hydrocarbon solvent and charging the mixture to a reactor. A molecular weight modifier selected from nonconjugated acyclic olefins is then added to the reactor followed by an alkylaluminum halide cocatalyst and at least one tungsten or molybdenum compound that serves as a catalyst. The catalyst is added as a solution in an alkylester of a saturated carboxylic acid. The polymerization reaction can be conducted at about 0° C. to 200° C., preferably 25° C. to 100° C., with stirring and produces little heat. The reaction time to completion is short, i.e., on the order of less than two hours, and the reaction products are smooth, viscous materials comprising a polymer dispersed in a solvent. The reaction is shortstopped by addition of an alcohol, such as ethanol.

The reason for solubilizing the tungsten or molybdenum catalyst in an alkylester solvent is due to the fact that the catalyst is essentially insoluble in the hydrocarbon reaction solvent. The necessity of preparing a solution of the catalyst in an alkylester solvent is not only costly, time consuming, and requires an additional step, but also presents a dilemma in a continuous polymerization process. As such a continuous process proceeds, the small amount of the alkylester solvent accumulates over a period of time requiring procedures for its removal.

There are other disadvantages inherent in the present process for polymerizing cyclic olefins. Since the tungsten or molybdenum catalyst is unstable in air and degrades in presence of moisture, special precautions must be taken to prevent its contact with air and humidity. In presence of water, the catalyst reacts to form a hydroxide and hydrochloric acid, which is corrosive to metal piping, pumps and any other metal materials it contacts.

There is another problem with the tungsten or molybdenum catalyst as it is presently used. The catalyst, when mixed with a monomer, causes very slow although significant polymerization of the monomer over longer periods of time. This is undesirable since it is of a definite advantage to have a totally inactive catalyst until the alkylaluminum halide cocatalyst is added. In certain applications, process design is formulated on the principle of storing a monomer and a catalyst in one tank and a monomer and the alkylaluminum halide cocatalyst in another tank whereby the mixtures from the two tanks are separately conveyed to a reactor and mixed therein to initiate the reaction. Due to slight polymerization of the monomer in presence of the salt catalyst, such process design is rendered impractical.

Last, but not least, the tungsten or molybdenum catalyst currently in use is not soluble in the monomer. As is well known, it is of paramount importance in certain polymerization procedures, such as bulk polymerization and reaction injection molding, that the catalyst be soluble in the monomer. Unless the catalyst is soluble in the monomer, these procedures cannot be carried out in a practical manner.

SUMMARY OF THE INVENTION

The present invention relates to a process for polymerizing at least one norbornene-type monomer in presence of a catalyst mixture comprising at least one alkylaluminum halide cocatalyst and at least one organoammonium molybdate or tungstate catalyst that is soluble in the hydrocarbon reaction solvent and the monomer or monomers to be polymerized. The process of this invention eliminates the need for using a separate solvent to solubilize the organoammonium tungsten or molybdenum catalyst and makes possible polymerization of the monomer or monomers in bulk in absence of any solvent.

DETAILED DESCRIPTION OF THE INVENTION

This invention resides in the use of an organoammonium molybdate or tungstate catalyst in the ring opening polymerization of a norbornene-type monomer. The organoammonium molybdate or tungstate is soluble in the hydrocarbon reaction solvent as well as in the monomer to be polymerized. It is used in conjunction with an alkylaluminum halide cocatalyst to initiate the reaction, as is well known in the art.

The polymerization process described herein can be carried out by mixing a hydrocarbon reaction solvent with a norbornene-type monomer or a mixture of such monomers, with or without other polymerizable monomers, and charging the monomer-solvent mixture into a reactor. A molecular weight modifier selected from nonconjugated acyclic olefins is then added to the reactor followed by at least one alkylaluminum halide and at least one organoammonium molybdate or tungstate that is soluble in the hydrocarbon reaction solvent as well as in the norbornene-type monomer. The reaction can be conducted at about 25° C. to completion in less than two hours and shortstopped by addition of an alcohol. The resulting products are smooth, viscous polymer cements, i.e., polymer in a solvent. Upon removal of the solvent, the polymer is a solid plastic.

Suitable organoammonium molybdates and tungstates are selected from those defined as follows:

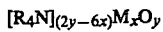

$$[R^1{}_3NH]_{(2y-6x)}M_xO_y$$

where O represents oxygen; M represents either molybdenum or tungsten; x and y represent the number of M and O atoms in the molecule based on the valence of +6 for molybdenum, +6 for tungsten and −2 for oxygen; and the R and $R^1$ radicals can be same or different and are selected from hydrogen, alkyl and alkylene groups each containing from 1 to 20 carbon atoms, and cycloaliphatic groups each containing from 5 to 16 carbon atoms. All of the R and $R^1$ radicals cannot be hydrogens or be small in the number of carbon atoms since such a condition will render the molecule essentially insoluble in hydrocarbons and most organic solvents. In a preferred embodiment, the R radicals are selected from alkyl groups each containing 1 to 18 carbon atoms wherein the sum of carbon atoms on all the R radicals is from 20 to 72, more preferably from 25 to 48. In a preferred embodiment, the $R^1$ radicals are selected from alkyl groups each containing from 1 to 18 carbon atoms wherein the sum of carbon atoms on all of the $R^1$ radicals is from 15 to 54, more preferably from 21 to 42.

It has been found that in the case of the organoammonium molybdates and tungstates represented by the formula $$[R_4N]_{(2y-6x)}M_xO_y$$

where all R radicals are the same, each can contain from 4 to 18 carbon atoms. Where three R radicals are the same, each containing from 7 to 18 carbon atoms, the remaining R can contain from 1 to 18 carbon atoms. Where three R radicals are the same, each containing 4 to 6 carbon atoms the remaining R radical can contain 4 to 18 carbon atoms. In the case where two of the four R radicals are the same, the two same R radicals can each contain from 12 to 18 carbon atoms and the remaining two R radicals can contain from 1 to 18 carbon atoms. With respect to each other, the remaining two R radicals can be same or different as long as each contains 1 to 18 carbon atoms. Where all R radicals are different, the sum thereof can be in the range of 20 to 27 carbon atoms.

Similar remarks apply to organoammonium molybdates and tungstates that are defined by the following formula:

$$[R^1{}_3NH]_{(2y-6x)}M_xO_y$$

The $R^1$ radicals cannot be too small if the molecule is to be soluble in a hydrocarbon reaction solvent and/or a norbornene-type monomer. Where all $R^1$ radicals are the same in the above formula, each can contain from 5 to 18 carbon atoms. Where two $R^1$ radicals are the same or all the $R^1$ radicals are different, each can contain from 1 to 18 carbon atoms and the sum thereof can be in the range of 15 to 72 carbon atoms. Included herein are also compounds wherein one $R^1$ radical is hydrogen in which case, the remaining two $R^1$ radicals can each contain 12 carbon atoms and greater, i.e., 12 to 18 carbon atoms.

Specific examples of suitable organoammonium molybdates and tungstates described herein include tridodecylammonium molybdates and tungstates, methyltricaprylammonium molybdates and tungstates, tri(tridecyl)ammonium molybdates and tungstates, and trioctylammonium molybdates and tungstates.

The alkylaluminum halide that is used in conjunction with at least one organoammonium molybdate or tungstate as a polymerization catalyst is selected from monoalkylaluminum dihalides $RAlX_2$, dialkylaluminum monohalides $R_2AlX$, aluminum sesquihalides $R_3Al_2X_3$, trialkylaluminum $R_3Al$, aluminum trihalide $AlX_3$, and mixtures thereof. In the formulas for the alkylaluminum halide catalysts, R is an alkyl radical containing 1 to 12 carbon atoms, preferably about 2 to 4 carbon atoms, and X is a halogen selected from chlorine, iodine, bromine and fluorine. Specific examples of such alkylaluminum halides include ethylaluminum dichloride, diethylaluminum monochloride, ethylaluminum sesquichloride, diethylaluminum iodide, ethylaluminum diiodide, trialkylaluminum compound with elemental iodine, propylaluminum dichloride, propylaluminum diiodide, isobutylaluminum dichloride, ethylaluminum dibromide, methylaluminum sesquichloride, and methylaluminum sesquibromide.

Although aluminum is the preferred reducing agent in the alkylaluminum halide cocatalysts, other organometallic halide reducing agents can function as well. Metals that form suitable organometallic cocatalysts include lithium, magnesium, boron, lead, zinc, tin, silicon and germanium. Also, the metallic hydrides can be substituted in whole or in part for the organometallic cocatalysts.

The organoammonium molybdate or tungstate or a mixture thereof, is employed at a level of about 0.01 to 50 millimoles molybdenum or tungsten per mole of total monomer, preferably 0.1 to 10 millimoles. The molar ratio of the alkylaluminum halide to the organoammonium molybdate and/or tungstate is not critical and can be in the range of about 200:1 or more to 1:10, preferably from 10:1 to 2:1 of aluminum to molybdenum or tungsten.

The norbornene-type monomers or cycloolefins that can be polymerized in accordance with the process described herein are characterized by the presence of the norbornene group, defined structurally by the following formula I:

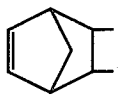

(I)

Pursuant to this definition, suitable norbornene-type monomers include substituted and unsubstituted norbornenes, dicyclopentadienes, dihydrodicyclopentadienes, trimers of cyclopentadiene, and tetracyclododecenes. Preferred monomers of the norbornene-type are those defined by the following formulas II and III:

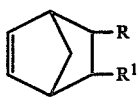 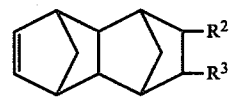

(II)     (III)

where R and $R^1$ are independently selected from hydrogen, alkyl groups of 1 to 20 carbon atoms, and saturated and unsaturated hydrocarbon cyclic groups formed by R and $R^1$ together with the two ring carbon atoms connected thereto containing 4 to 7 carbon atoms. In a preferred embodiment, R and $R^1$ are independently selected from hydrogen, alkyl groups of 1 to 3 carbon atoms, and monounsaturated hydrocarbon cyclic groups containing 5 carbon atoms, the cyclic group being formed by R and $R^1$ as well as by the two carbon atoms connected to R and $R^1$. In reference to formula III, $R^2$ and $R^3$ are independently selected from hydrogen and alkyl groups containing 1 to 20 carbon atoms, preferably 1 to 3 carbon atoms. Examples of monomers referred to herein include dicyclopentadiene, methyltetracyclododecene, 2-norbornene and other norbornene monomers such as 5-methyl-2-norbornene, 5,6-dimethyl-2-norbornene, 5-ethyl-2-norbornene, 5-butyl-2-norbornene, 5-hexyl-2-norbornene, 5-octyl-2-norbornene, and 5-dodecyl-2-norbornene.

This invention especially contemplates preparation of homopolymers, copolymers and terpolymers of methylnorbornene, methyltetracyclododecene and dicyclopentadiene and especially homopolymers of methyltetracyclododecene and copolymers of methyltetracyclododecene and methylnorbornene. The copolymers of methyltetracyclododecene and methylnorbornene are polymerized from monomer mixtures containing from 1 to 75% by weight methylnorbornene and the copolymers contain from 1 to 75% by weight of polymerized methylnorbornene. The terpolymers are polymerized from monomer mixtures containing 1 to 75% by weight methylnorbornene and 25 to 99% by weight methyltetracyclododecene, with the remainder being dicyclopentadiene. The terpolymers contain from 1 to 75% by weight of polymerized methylnorbornene and 25 to 99% by weight polymerized methyltetrocyclododecene.

The monomer or mixture of norbornene-type monomers can contain up to about 20% by weight thereof of at least one other polymerizable monomer. Such other polymerizable monomers are preferably selected from mono- and dicycloolefins containing 4 to 12 carbon atoms, preferably 4 to 8 carbon atoms, examples of which include cyclobutene, cyclopentene, cyclopentadiene, cycloheptene, cyclooctene, 1,5-cyclooctadiene, cyclodecene, cyclododecene, cyclododecadiene, and cyclododecatriene. Also suitable are bicyclic olefins containing 7 to 16 carbon atoms and 1 to 4 double bonds, preferably 8 to 12 carbon atoms and 2 to 3 double bonds, such as norbornadiene. As should be apparent, cycloolefins that cannot be polymerized by ring opening, i.e., cyclohexene and derivatives thereof, are not employed in the polymerization process of this invention except as solvent.

The use of a polymerization reaction solvent in the process of this invention is preferred but not required. Suitable solvents include aliphatic and cycloaliphatic hydrocarbon solvents containing 4 to 10 carbon atoms such as pentane, hexane, heptane, octane, cyclohexane, cyclohexene, cyclooctane and the like; aromatic hydrocarbon solvents containing 6 to 14 carbon atoms which are liquid or easily liquified such as benzene, toluene, naphthalene and the like; and substituted hydrocarbons wherein the substituents are inert, such as dichloromethane, chloroform, chlorobenzene, dichlorobenzene, and the like. Cyclohexane was found to be an excellent solvent. The polymer need not be soluble in the solvent. The solvent may be added at any point in the charging procedure, but a portion, preferably 0.1 to 10% of the total solvent, is used to dissolve the catalyst and the remainder added before the catalyst solution. Generally, $\frac{1}{2}$ to 2 liters of solvent is used per 100 grams of monomer.

A polymerization activator may be used but is not generally needed. Examples of activators include water, methanol, ethanol, isopropyl alcohol, benzyl alcohol, phenol, ethyl mercaptan, 2-chloroethanol, 1,3-dichloropropanol, p-bromophenol, epichlorohydrin, ethylene oxide, cyclopentene-2-hydroperoxide, cumyl hydroperoxide, tertiary butyl peroxide, benzoyl peroxide, and air or oxygen. Excellent activation is obtained by using air or a peroxide or hydroperoxide as the activator, especially by using the organic peroxides such as benzoyl peroxide. The activator may be employed in a range from about 0 moles to about 3 moles per mole of alkylaluminum halide cocatalyst, more preferably from about 0 to about 1 mole per mole. The activator may be added at any point in the charge procedure but it is more preferably added last, or with the organoammonium molybdate or tungstate catalyst.

At least one nonconjugated acyclic olefin can be used as a molecular weight modifier having at least one hydrogen on each double-bonded carbon atom and containing 2 to 12 carbon atoms, more preferably 3 to 8 carbon atoms. Inert substituents on the remaining carbon atoms are selected from the group consisting of hydrogens and alkyl groups containing 1 to 8 carbon atoms. Examples of suitable acyclic olefins include 1-olefins such as 1-butene, 3-methyl-1-butene, and the like; 2-olefins such as 2-pentene, 4-methyl-2-pentene, and the like; 3-olefins such as 5-ethyl-3-octene, and the like; nonconjugated diolefins such as 1,6-hexadiene, and the like; and nonconjugated triolefins such as 1,4,7-octatriene. More preferably, the nonconjugated acyclic olefin is selected from the group consisting of 1-olefins and 2-olefins containing 3 to 8 carbon atoms such as 1-butene, 3-methyl-1-butene, 2-pentene, 4-methyl-2-pentene, and the like. Compounds not having hydrogen atoms substituted on double-bonded carbons are unreactive in this invention. Even conjugated olefins such as butadiene, isoprene and the like are active modifiers.

The nonconjugated acyclic olefin can be used in a molar ratio to total monomer charge of from about 0.0001 to about 1 mole per mole of the monomer charge. The nonconjugated acyclic olefin can be charged directly or in solution at any point in the charge procedure, but it is more preferably charged along with the monomers. When charged last, the nonconjugated acyclic olefin is preferably charged before reaction begins.

The monomers can be added at any point in the charging procedure. Normally, however, the monomers, solvent and nonconjugated acyclic olefin are added first to the reactor vessel. These ingredients can be added separately or as a mixture of ingredients. Next, the alkylaluminum halide cocatalyst and the organoammonium molybdate or tungstate catalyst are added separately, usually in the hydrocarbon solvent described above. The organoammonium molybdate or tungstate catalyst component is added following addition of the alkylaluminum halide although the order can be reversed. Completion of the polymerization reaction is indicated by the disappearance of the monomer in the charge, as monitored by gas chromatography.

Since the organoammonium molybdates and tungstates described herein are soluble in norbornene-type monomers or a mixture thereof, the polymerization can be carried out in absence of a solvent. The alkylaluminum halides are also soluble in such monomers. This, of course, facilitates polymerization in bulk and also makes it possible to use the system in reaction injection molding process.

In order to further illustrate the invention described herein, the following examples are presented that demonstrate certain aspects of the invention herein in greater detail. It is to be understood, however, that the examples are presented for illustrative purposes and not in any sense that would limit the scope of the invention herein, the scope of which is defined by the appended claims.

EXAMPLE 1

This example demonstrates preparation of a homopolymer of methyltetracyclododecene in cyclohexane reaction solvent using tridodecylammonium molybdate as a 0.10 molar molybdenum solution in cyclohexane, and ethylaluminum sesquichloride, $(C_2H_5)_3Al_2Cl_3$, as a 0.5 molar aluminum solution also in cyclohexane.

The procedure involved the addition of 475 ml of cyclohexane, 100 ml of methyltetracyclododecene and 25 ml of hexene-1 to a glass reactor. This was followed by the addition of 0.5 ml of ethylaluminum sesquichloride solution and 0.15 ml of the tridodecylammonium molybdate solution to the reactor as catalyst components. Temperature of the reactor contents at this point was 67° F. which increased to slightly above 130° F. during about 18 minutes of the reaction period. While the reaction was in progress, additional ethylaluminum sesquichloride and tridodecylammonium molybdate was added to the reactor. Total amount of the catalyst used was 1.0 ml of ethylaluminum sesquichloride solution and 0.30 ml of the tridodecylammonium molybdate solution. On the basis of one mol of methyltetracyclododecene monomer, total amount of catalyst components used was 0.07 millimole of aluminum as ethylaluminum sesquichloride and 0.004 millimole of molybdenum as a tridodecylammonium molybdate solution. The reaction was shortstopped by addition of 4 ml of isopropanol.

The resulting cement, i.e., polymer in solvent, was placed in a blender and at least one volume of isopropanol was admixed. The mixture was blended for about one minute to obtain the polymer in fine crumb form and then deposited onto filter paper in a funnel. The solids were washed with about two volumes of isopropanol, transferred into a pan, toluene was poured thereover to cover the solids, and 3.0 grams of Ethyl 330 antioxidant was admixed. The pan was covered and left standing for several hours to allow the polymer to swell and dissolve in toluene. The cover was then removed to allow the solvent to evaporate in a hood overnight to 90 to 95% dryness. The polymer was then placed in a vacuum oven at 50°–60° C. and vacuum was pulled with a water pump for 8 to 16 hours. Amount of polymer recovered was 115 grams, 3 grams of which was antioxidant with about 12 grams being solvent that was not removed, this being based on the assumption of 100% conversion of the monomer. Generally, actual conversion is 98 to 99%. The polymer was free of gel with an inherent viscosity of 1.0 measured at 25° C. as a solution of 0.1 gram of polymer in 100 ml of toluene.

EXAMPLE 2

This experiment demonstrates the degree of solubility of three alkylammonium molybdates in toluene. Three samples were prepared each containing 50 ml of toluene and 1.0 g of a tetrapentylammonium molybdate (Sample A), a trioctylammonium molybdate (Sample B), and a methyltricaprylammonium molybdate (Sample C). Preparation of the samples was done by purging a 7-ounce glass bottle with nitrogen, transferring the catalyst in air into the bottle, adding dry toluene and capping the bottle. Initially, all three catalysts and some solubility at room temperature, however, when the bottles were shaken for about 35 minutes on a shaker, the following observations were made:

Sample A—solids present and liquid was hazy yellow;

Sample B—no solids present and solution was hazy yellow;

Sample C—clear solution with a yellow tint.

On the basis of results given above, the tetrapentylammonium molybdate catalyst does not appear to be soluble in toluene at room temperature whereas the trioctyl and tricaprylammonium molybdates are soluble in toluene at room temperature. Although a catalyst may be essentially insoluble in a solvent at room temperature, this does not, ipso facto, indicate that the catalyst is unsuitable. The catalyst can be suitable if it has sufficient solubility in a solvent at the reaction temperature.

EXAMPLE 3

This example demonstrates suitability of a methyltricaprylammonium molybdate (Sample A) and a trioctylammonium molybdate (Sample B) as catalysts for polymerizing methyl tetracyclododecene (MTD) with a 0.5 molar solution of ethylaluminum dichloride in toluene, carried out pursuant to the procedure set forth in Example 2. Amounts of ingredients in each sample is given in the table, below, where MTCAM represents methyltricaprylammonium molybdate that was used as 0.1 molar molybdenum solution in toluene, TOAM represents the trioctylammonium molybdate that was used as 0.1 molar molybdenum solution in toluene, and $Et_3Al_2Cl_3$ represents ethylaluminum sesquichloride that was used as a 0.5 molar solution, based on aluminum, in toluene:

|  | Sample A | Sample B |
| --- | --- | --- |
| Cyclohexane | 95 ml | 95 ml |
| MTD | 20 ml | 20 ml |
| Hexene-1 | 5 ml | 5 ml |
| MTCAM Soln. | 0.3 ml | — |
| TOAM Soln. | — | 0.3 ml |
| $Et_3Al_2Cl_3$ Soln. | 0.2 ml | 0.1 ml |
| Reaction Time | 41 min. | 96 min. |
| Polymer Weight, g. | 16.6 | 21.0 |
| Inherent Viscosity, dl/g | 1.2 | 1.7 |
| % Gel | 0 | 3 |

EXAMPLE 4

This example sets forth preparation of methylnorbornene polymer in toluene solvent using a trioctylammonium molybdate (TOAM) as a 0.1 molar molybdenum solution in toluene and ethylaluminum sesquichloride catalyst ($Et_3Al_2Cl_3$). The alkylaluminum halide was a 0.5 molar aluminum solution in toluene. The following ingredients were used in amounts indicated:

| Toluene | 95 ml. |
| --- | --- |
| Methyl norbornene | 20 ml. |
| Hexene-1 | 5 ml. |
| ($Et_3Al_2Cl_3$) Soln. | 0.2 ml. |

| -continued | |
|---|---|
| TOAM Soln. | 0.2 ml. |

The reaction was shortstopped with 1 ml of methanol after about 160 minutes and amount of polymer recovered, in the manner described in Example 1, was 17.8 g. Its dilute solution viscosity was 1.0 with no gel.

EXAMPLE 5

Solution polymerization of dicyclopentadiene (DCPD) is demonstrated herein in toluene using a trioctylammonium molybdate (TOAM) as a 0.1 molar molybdenum solution in toluene, ethylaluminum sesquichloride ($Et_3Al_2Cl_3$) as a 0.5 molar aluminum solution in toluene, and triethyl aluminum ($Et_3Al$) as a 0.5 molar solution in toluene, based on aluminum. Polymerization was carried out in the presence of ingredients set forth below:

| Toluene | 95 ml |
|---|---|
| DCPD | 20 ml |
| Hexene-1 | 5 ml |
| TOAM Soln. | 0.6 ml |
| $Et_3Al_2Cl_3$ Soln. | 0.45 ml |
| $Et_3Al$ Soln. | 0.3 ml |

After repeating the recovery procedure of Example 1, 15.5 g of polymer was obtained. Although triethylaluminum was used in this example, it is believed that its use was superfluous and can be entirely omitted without adversely affecting the polymerization reaction.

EXAMPLE 6

This example illustrates preparation of methyl norbornene (MNB) homopolymer in cyclohexane using a trioctylammonium molybdate (TOAM) as a 0.1 molar molybdenum solution in toluene and 0.5 molar aluminum solution of ethylaluminum sesquichloride ($Et_3Al_2Cl_3$) in toluene. Polymerization was carried out in the presence of the following ingredients.

| Cyclohexane | 95 ml |
|---|---|
| MNB | 20 ml |
| Hexene-1 | 5 ml |
| TOAM Soln. | 0.1 ml |
| $Et_3Al_2Cl_3$ Soln. | 0.2 ml |

The reaction time was about one half hour and the solution obtained was a viscous cement polymer.

EXAMPLE 7

This example demonstrates polymerization of methyltetracyclododecene (MTD) in bulk without any solvent using a 0.1 molar molybdenum tridodecylammonium (TDAM) molybdate solution and 0.5 molar aluminum solution of ethylaluminum sesquichloride ($Et_3Al_2Cl_3$), both in MTD. Polymerization was carried out with the following ingredients:

| MTD | 20 ml |
|---|---|
| Polygard AO | 0.1 ml |
| TDAM Soln. | 0.1 ml |
| $Et_3Al_2Cl_3$ Soln. | 0.2 ml |

The preparation procedure included the addition of MTD containing the antioxidant to a reactor followed by the ethylaluminum sesquichloride solution that had aged for over a month, and the TDAM solution. The initial temperature was room temperature that increased to about 60° C. The mass solidified in about 180 minutes resulting in a plastic polymer.

We claim:

1. Process for preparing a polymer by ring opening polymerization comprising polymerizing a norbornene-type monomer, or a mixture thereof, in presence of an effective amount of at least one organoammonium catalyst and at least one alkylaluminum halide cocatalyst, said norbornene-type monomer is characterized by the presence of the norbornene group defined as follows:

and said organoammonium catalyst is selected from organoammonium molybdates and organoammonium tungstates that are soluble in said monomer or said monomer mixture.

2. Process of claim 1 wherein the step of polymerizing said norbornene-type monomer or a mixture thereof is carried out in presence of a hydrocarbon solvent and said alkylaluminum halide cocatalyst contains 1 to 12 carbon atoms in the alkyl group, with said organoammonium catalyst being soluble in said hydrocarbon solvent, amount of said organoammonium catalyst is 0.01 to 50 millimoles molybdenum or tungsten per mole of total monomer and the molar ratio of said alkylaluminum halide cocatalyst as aluminum to said organoammonium catalyst as molybdenum or tungsten is in the range of 200:1 to 1:10.

3. Process of claim 1 wherein said alkylaluminum halide cocatalyst is defined by the following formulas I, II and III:

$$RAlX_2 \qquad (I)$$

$$R_2AlX \qquad (II)$$

$$R_3Al_2X_3 \qquad (III)$$

where R is an alkyl group that contains 1 to about 12 carbon atoms and X is a halide; and said organoammonium catalyst is defined by the following formulas IV and V:

$$[R_4N]_{(2y-6x)}M_xO_y \qquad (IV)$$

$$[R^1_3NH]_{(2y-6x)}M_xO_y \qquad (V)$$

where each R and $R^1$ group is independently selected from hydrogen, alkyl and alkylene groups each containing 1 to 20 groups, and cycloaliphatic groups each containing 5 to 16 carbon atoms, the sum of all carbon atoms represented by said R groups is 20 to 72 and the sum of all carbon atoms represented by said $R^1$ groups is 15 to 54; M is selected from molybdenum (VI) and tungsten (VI); and x and y represent the number of M and O atoms in the molecule.

4. Process of claim 3 wherein the alkyl group of said alkylaluminum halide cocatalyst contains 2 to 4 carbon atoms and the R and $R^1$ groups of said organoammonium catalyst are individually selected from alkyl groups.

5. Process of claim 4 wherein in the formula $$[R_4N]_{(2y-6x)}M_xO_y$$

each R group is selected from alkyl groups each containing 4 to 18 carbon atoms where all R groups are the same; where three R groups are same each containing 7 to 18 carbon atoms, the remaining R group contains 1 to 18 carbon atoms; whereas where three R groups are the same each containing 4 to 6 carbon atoms, the remaining R radical contains 4 to 18 carbon atoms; where two R groups are same and two R groups are different, the two of the same R groups each contains 12 to 18 carbon atoms whereas the two remaining different R groups each contains 1 to 18 carbon atoms and can be same or different relative to each other; provided that the sum of all of the R radicals is in the range of 25 to 48 carbon atoms, and wherein in the formula $$[R^1{}_3NH]_{(2y-6x)}M_xO_y$$

O, M, x and y are defined as above whereas each $R^1$ is selected from alkyl groups containing 5 to 18 carbon atoms where all $R^1$ groups are the same; where two $R^1$ groups are same, or where all $R^1$ radicals are different, each contains 1 to 18 carbon atoms; provided that the sum of all of the $R^1$ radicals is in the range of 21 to 42 carbon atoms.

6. Process of claim 5 wherein said hydrocarbon solvent is selected from aliphatic and cycloaliphatic solvents containing 4 to 18 carbon atoms, aromatic solvents containing 6 to 14 carbon atoms, and substituted hydrocarbons wherein the substituents are inert; and said monomer mixture containing up to about 20% by weight thereof of other polymerizable monomers.

7. Process of claim 6 wherein said norbornene-type monomer is selected from substituted and unsubstituted 2-norbornenes, dicyclopentadienes, dihydrodicyclopentadienes, trimers of cyclopentadienes, tetracyclododecenes, and mixtures thereof; and the molar ratio of said alkylaluminum halide cocatalyst to said organoammonium catalyst is 5:1 to 2:1.

8. Process of claim 6 wherein said norbornene-type monomer is selected from monomers, and mixtures thereof, defined by the following formulas VI and VII:

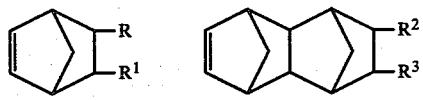

where R and $R^1$ are independently selected from hydrogen, alkyl groups of 1 to 20 carbon atoms, and saturated and unsaturated hydrocarbon cyclic groups formed by R and $R^1$ together with the two ring carbon atoms connected thereto containing 4 to 7 carbon atoms; and wherein $R^2$ and $R^3$ are independently selected from hydrogen and alkyl groups of 1 to 20 carbon atoms.

9. Process of claim 8 wherein R and $R^1$ of said norbornene-type monomer are independently selected from hydrogen, alkyl groups of 1 to 3 carbon atoms, and monounsaturated hydrocarbon cyclic groups containing 5 carbon atoms; wherein $R^2$ and $R^3$ are independently selected from hydrogen and alkyl groups containing 1 to 3 carbon atoms.

10. Process of claim 9 wherein said norbornene-type monomer is selected from norbornene, methyl norbornene, tetracyclododecene, methyl tetracyclododecene, dicyclopentadiene, and mixtures thereof.

* * * * *